United States Patent

[11] 3,566,196

| [72] | Inventor | Robert E. Einem<br>Canoga Park, Calif. |
|---|---|---|
| [21] | Appl. No. | 751,839 |
| [22] | Filed | Aug. 12, 1968 |
| [45] | Patented | Feb. 23, 1971 |
| [73] | Assignee | International Telephone and Telegraph Corporation<br>New York, N.Y. |

[54] SEQUENTIAL COUNT CIRCUIT WITH READOUT
5 Claims, 1 Drawing Fig.

[52] U.S. Cl. ................................................. 317/140,
                                                                317/148.5
[51] Int. Cl. ........................................... H01h 47/32
[50] Field of Search ................................. 317/139,
                                                                140

[56] References Cited
UNITED STATES PATENTS
2,087,039  7/1937  McMaster .................  317/140X

*Primary Examiner*—Lee T. Hix
*Attorneys*—C. Cornell Remsen, Jr., Walter J. Baum, Paul W. Hemminger, Percy P. Lantzy and Thomas E. Kristofferson ABSTRACT: The invention relates to a sequential counting circuit permitting a single-pole, multiposition wiper arm in each decade counter to function (1) as switching logic for the carryover pulse in sequential counting; (2) as a reset to zero positioning of the wiper arm, and (3) as an isolated readout. Further, a single wiper position of each decade counter is used for all three circuit functions.

PATENTED FEB 23 1971
3,566,196
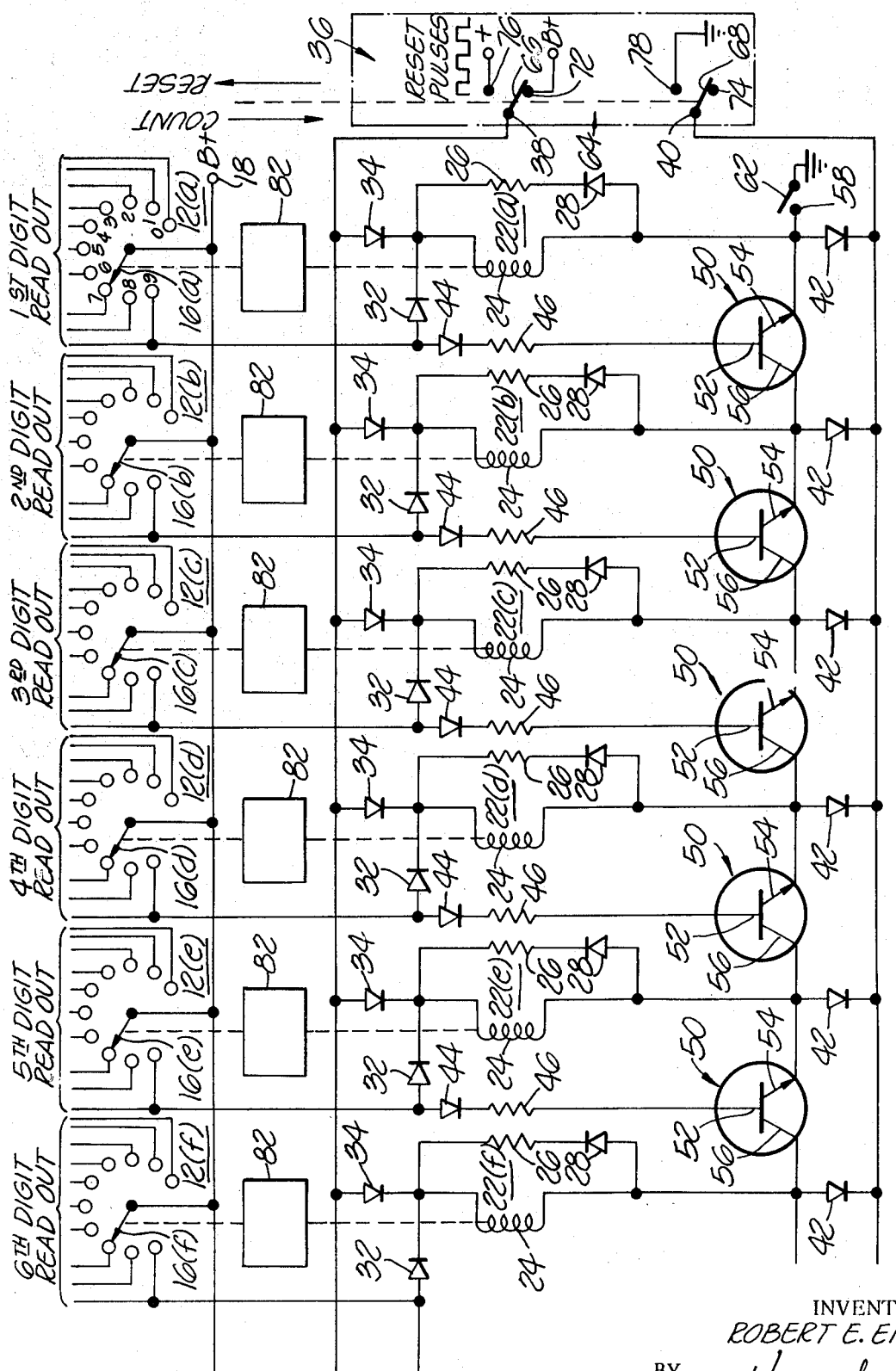
INVENTOR
ROBERT E. EINEM
BY 
ATTORNEY

SEQUENTIAL COUNT CIRCUIT WITH READOUT

SEQUENTIAL COUNT CIRCUIT WITH READOUT

The invention relates in general to sequential counting circuits and more particularly to a circuit utilizing electromechanical counters for isolated readout circuitry and for sequential counting.

BACKGROUND OF THE INVENTION

In sequential counting circuits utilizing electromechanical counters, complex electronic logic has been required to isolate the counting functions from the single-pole rotary wiper arm on the counter. In order to overcome the use of complex circuitry, counters have been designed with two wiper arms, one of which is used as an isolated readout device, normally connected to a readout display, and a second wiper arm is used for a carryover for sequential counting and a reset for zero logic.

Use of either the complex circuitry or two wiper arms increases the chance of failure of a part of a system while also increasing the initial costs of the system.

In order to overcome the attendant prior art disadvantages of sequential counting circuits with readouts, the circuit of the present invention utilizes a single-pole, multiposition wiper arm in each decade counter to function (1) as switching logic for the carryover pulse in sequential counting; (2) as a reset for zero positioning of the wiper arm, and (3) as an isolated readout. Further, a single wiper position of each decade counter is used for all three circuit functions.

SUMMARY OF THE INVENTION

More particularly, the invention comprises a plurality of wiper circuits whose wiper arms are connected in parallel to a readout voltage source. Associated with each of the wiper circuits is a counting circuit, with adjacent counting circuits being coupled together through switching means. The readout voltage source is connected to the counting circuit through the wiper arm and one of the counter positions as switching logic for the carryover pulse in sequential counting, and as logic for reset. Further, a control circuit supplies a source of power to the counting circuit in the count mode and supplies reset pulses to the counting circuit in the reset mode. The readout voltage source is connected to the counting circuit through the wiper arm and one of the wiper circuit positions in the reset mode so as to cause the wiper arm to latch in a predetermined position accomplishing reset in each of the counters. Further, the readout voltage source is connected to a readout display through the wiper circuits to provide an isolated readout. The advantage of this invention, both as to its construction and mode of operation, will be readily appreciated as the same become better understood by reference to the following detailed description when considered in connection with the accompanying drawing.

BRIEF DESCRIPTION OF THE DRAWING

The figure is a diagram of a preferred embodiment of the sequential counting circuit embodying the present invention.

DESCRIPTION OF THE PREFERRED EMBODIMENT

Referring now to the figure, the invention comprises wiper circuits 12 *a—f.* Each of wiper circuits 12 *a—f* comprise a wiper arm 16 *a—f* respectively, which are connected in parallel to a source of readout voltage at terminal 18. The wiper arms 16 may contact one of the plurality of decade points numbered logically from "0" to "9" which are normally connected to an output display. The "9" position is also connected to transfer and reset circuitry. Each wiper circuit has associated therewith a counting circuit 22 *a—f*, respectively. Each of the circuits 22 comprise a counter coil 24 having connected in parallel therewith a series circuit comprising a resistor 26 and a diode 28. The counter coil 24 is connected at one end to the cathode of a diode 32 whose anode is connected to the "9" position of its respective decade counter. Further, the junction of the coil 24 and diode 32 is connected to the cathode of a diode 34 whose anode is connected to one side of a control circuit 36 at its terminal 38. The control circuit comprises a second terminal 40 which is connected to a cathode of a diode 42. The anode of the diode 42 is connected to the other side of the counter coil at the junction of the anode of the diode 28. The "9" position of each digital readout is also connected to the anode of a blocking diode 44 whose cathode is connected to one side of a resistor 46. The other side of each of the resistor 46 is connected to a switching transistor 50 at its base terminal 52.

The switching transistor 50 further comprises an emitter 54 which is connected to the junction of the anodes of diodes 28 and 42 of its respective counting circuit and a collector 56 which is connected to the junction of the anode of the diodes 28 and 42 of the next counting circuit stage. The emitter 54 of counting circuit 22 *a* is also connected to a switching count terminal 58. Count contact 62 which is movable to contact terminal 58 is connected, on its other side, to ground. The switching transistor 50 provides a switching function for the sequential counting between adjacent counting circuits and, therefore, is not required in the last circuit 22*f*.

The control circuit 36 comprises a two-pole switch 64 having a first pole 66 and a second pole 68, one side of each of the poles being connected to the terminals 38 and 42, respectively. In the count mode, the pole 66 is connected at its other side to the count power supply source terminal 72 and the pole 68 is connected to a nonoperative terminal 74. In the reset mode, the other side of the pole 66 is connected to a reset pulse terminal 76 and the other side of the armature 68 is connected to ground through a terminal 78.

A stepping mechanism 82 including a spring-biased armature associated with the coil 24 is connected to the wiper arm as indicated by the dotted lines in the drawing. The stepping mechanism may be of the conventional type wherein only when the control coil 24 is deenergized will the wiper arm move one position in a counterclockwise direction as shown in the drawing. The resistor 26 and diode 28 provide a discharge path for the coil 28 so as to limit back e.m.f. generated by the coil 24.

With the foregoing in mind, operation of the circuit of the figure is as follows:

With the control circuit 36 in the count position as shown in the drawing, each time the count contact 62 is closed, the count power supply source at terminal 72 is impressed across counter coil 24 of counting circuit 22 *a*. When the count contact is opened, the wiper arm 16 *a* moves to the next decade point on the counter. When the wiper arm reaches the "9" position, the readout voltage at terminal 18 is connected to the base of transistor 54 of counting circuit 22 *a* through a path comprising wiper arm 16 *a*, the "9" position of the wiper circuit 12 *a*, diode 44 and resistor 46.

When the contact 62 is closed again, the base-emitter circuit of transistor 50 is 72 biased and the voltage at terminal 18 is impressed across the counter coils of circuits 22 *a* and 22 *b*. Wiper arms 16 *a* and 16 *b* ) move one number position when the count contact is opened again. Thus, as can readily, be seen, when arms 16 *a* and 16 *b* are both at the "9" position, the next opening of contact 62 will cause arms 16 *a* , 16 *b* and 16 *c* to move one position and so on.

Should it be desired to reset all the wiper circuits 12 *a—f* to zero, switch 64 is moved connecting armature 66 to contact reset pulse terminal 76 and armature 68 to contact terminal 78. The reset pulses energize each of the counter coils through parallel paths comprising diode 34, counter coil 24, diode 42, terminal 78 and ground. When the decade counters reach the "9" position, the counter coil is latched in the energized state by the readout voltage through parallel paths comprising wiper arm 16 and the "9" position of each wiper circuit, the diode 32, counter coil 24, diode 42, terminal 78 and ground.

When the control circuit 36 is returned again the in count mode, the path through diode 42 is broken and all counter coils deenergized and wiper arms 16 a—f step to the next position which is "0".

The diode 34 prevents the readout voltage from being applied across the other counter coils when one of the wiper arms 16 is in the "9" position and it is desired to operate the circuit in the reset mode.

If the transistor 50 has sufficiently high impedance diode 44 is not required to provide isolation for the readout circuit. Further, it should be understood that a normally open relay could be used instead of the switching transistor 50.

While the circuit was designed for decade counters wherein the wiper arm is switched to the next contact after the removal of the pulse count, it should be understood of course, that with minor modification of the circuitry other types of wiper circuits could be used. Moreover, it should be understood that the use of the position "9" as a terminal for the connection of the readout voltage to the counting circuit in the description of the device with a 10 position counter is merely for explanation purposes and other positions or numbered position counters could be used.

Further, while the circuit has been described as operating in conjunction with a readout circuit it should be understood, of course, that it could be operated in conjunction with a read-in circuit or a predetermining circuit.

Moreover, the count contact could also be replaced by a source of negative pulses, each pulse operating the circuit in a manner similar to the opening and closing of the count contact 62. Also, while the sources of voltage have been depicted as positive sources, it should be understood that negative sources could be used with corresponding conventional changes in the diodes and transistors.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

I claim:

1. Counter comprising: a plurality of readout devices, each device including a plurality of electrical contacts including a first and last contact and a wiper to be stepped from a position in engagement with one contact to a position in engagement with the next succeeding contact from first to last in succession, and then from last to first; a plurality of stepping mechanisms for said devices, respectively, each stepping mechanism including a coil to step its corresponding wiper immediately after the coil is deenergized, said mechanisms being of the type to remain stationary immediately after the corresponding coils thereof are energized and so long as they are energized; an electrical conductor connected to all of said wipers, whereby a readout voltage may be supplied selectively to said contacts, all of said coils having first and second sides, one of said coils being the units coil, another of said coils being a second order coil, etc.; a first switch connected from the second side of the units coil to a point of reference potential, whereby closure thereof will cause energization of said units coil; a second electrically operable switch connected between said second side of said units coil and the second side of the second order coil; a third electrically operable switch connected between said second side of said second order coil to the second side of said third order coil, etc.; a double-pole, double-throw switch having first and second poles, first and second contacts for said first pole, and a third contact for said second pole; a first diode connected from each second coil side to said second pole, all of said diodes being poled in the same direction, said switch third contact being adapted to be connected to a point of reference potential; said first, second and third switches being adapted to be actuated by the voltage impressed upon the corresponding device last contact by the corresponding wiper thereof; a plurality of second diodes connected from said first pole to said first coil sides respectively, all of said second diodes being poled in the same direction, one of said first and second diodes being poled toward a corresponding coil and the other being poled away from the same corresponding coil, said first contact of said control switch being adapted to receive voltage pulses of the same polarity as said wiper voltage, said control switch second contact being adapted to receive an approximately constant direct-current voltage of the same polarity as said wiper voltage, said first and third contacts of said control switch being closable contemporaneously; and a third diode connected form each last contact to the first side of the corresponding coil thereof and poled in the same direction as the corresponding second diode is poled toward the same coil.

2. The invention as defined in claim 1, wherein said first, second, third, etc.; switches are transistor switches having a collector-emitter path between coil second sides, said transistors being of the type and poled to be conductive between second coil sides when one corresponding wiper engages a corresponding last contact and the readout voltage is supplied to said one wiper.

3. The invention as defined in claim 2, wherein each transistor has a base connected from each corresponding last contact.

4. The invention as defined in claim 3, wherein a fourth diode is connected between each last contact and each corresponding transistor base, said fourth diodes being poled in the same direction away from said last contacts as said third diodes.

5. The invention as defined in claim 4, wherein a first resistor is connected from each fourth diode to a corresponding transistor base, a plurality of series circuits, each circuit including a second resistor and a fifth diode connected in parallel with each corresponding coil, each fifth diode being poled in the same direction toward the corresponding first coil side as the corresponding second diode.